United States Patent [19]

Shimoji et al.

[11] 4,019,471
[45] Apr. 26, 1977

[54] FUEL INJECTION TYPE ROTARY PISTON ENGINES

[75] Inventors: Masaharu Shimoji; Haruhiko Satow; Atsumichi Yamasaki, all of Hiroshima, Japan

[73] Assignee: Toyo Kogyo Co., Ltd., Hiroshima, Japan

[22] Filed: Mar. 11, 1976

[21] Appl. No.: 665,874

[30] Foreign Application Priority Data

Apr. 1, 1975 Japan .............................. 50-40034
Apr. 1, 1975 Japan .............................. 50-40035
Apr. 2, 1975 Japan .............................. 50-40511

[52] U.S. Cl. .............................................. 123/8.09
[51] Int. Cl.² ...................................... F02B 53/10
[58] Field of Search ............... 123/8.09, 8.11, 8.13

[56] References Cited

UNITED STATES PATENTS

| 3,882,828 | 5/1975 | Honiden | 123/8.09 |
| 3,901,198 | 8/1975 | Yamamoto | 123/8.09 |
| 3,905,337 | 9/1975 | Shimoji et al. | 123/8.09 |
| 3,958,539 | 5/1976 | Satow et al. | 123/8.09 |

*Primary Examiner*—Carlton R. Croyle
*Assistant Examiner*—Michael Koczo, Jr.
*Attorney, Agent, or Firm*—Fleit & Jacobson

[57] ABSTRACT

Rotary piston engine of fuel injection type wherein fuel injection is performed when the intake air flow is relatively high so that an improved fuel atomization can be attained. Further, the fuel injection timing is also determined from the view point that air-fuel mixture is forced toward the leading part of the intake working chamber. The engine has a peripheral intake port formed in the rotor housing and a side intake port formed in one of the side housings, said side intake port being used only in heavy load range of engine operation. The intake passage leading to the peripheral intake port is inclined in the direction of rotor rotation so that intake fluid is forced toward the leading part of the intake working chamber.

14 Claims, 6 Drawing Figures

$\theta_1 = 135°$
$\theta_2 = 75°$
$\theta_3 = 60°$

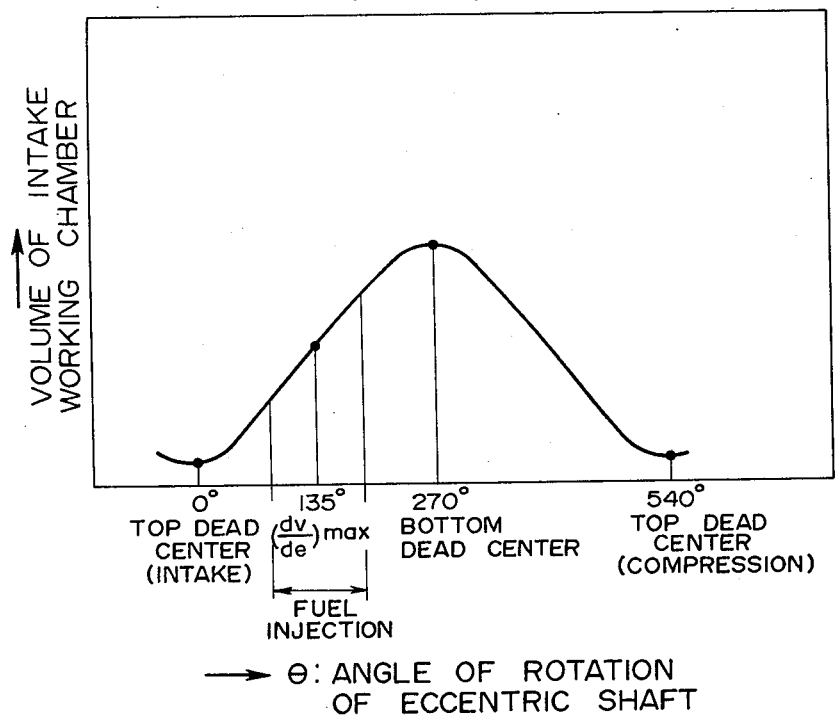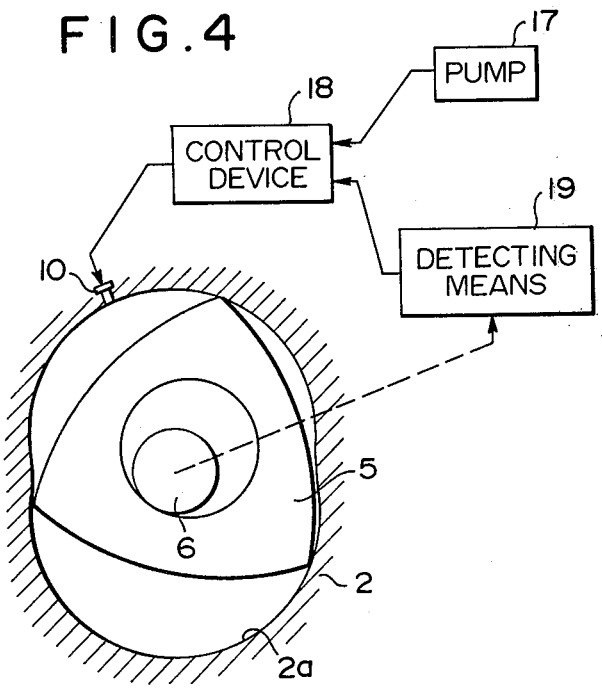

FUEL INJECTION TYPE ROTARY PISTON ENGINES

The present invention relates to rotary piston type internal combustion engines and, more particularly, to fuel injection type rotary piston engines.

Conventional rotary piston type engines comprise a casing including a rotor housing having an inner wall of multi-lobed trochoidal configuration and a pair of side housings secured to the opposite sides of the rotor housing to define therebetween a cavity of trochoidal configuration, a substantially polygonal rotor disposed in said cavity for rotation and revolution with apex portions in sliding contact with the inner wall of the rotor housing, said rotor having flanks each defining a working chamber of variable volume with the inner wall of the rotor housing. The casing is provided with intake port means opening to the cavity at one of the working chambers in intake stroke and with exhaust port means opening to another of the working chambers in exhaust stroke. Fuel may be introduced in the form of air-fuel mixture through intake passage means leading to the intake port means into the intake working chamber or, alternatively, injected directly through fuel injection means into the working chamber.

In this type of rotary piston engines, it has been known that there is a tendency that combustion flame propagates, under the influence of swirl in the working chamber, from the trailing side, that is, the side of the working chamber opposite to the rotation of the rotor, to the leading side, that is, the side of the working chamber in the direction of rotation of the rotor. There is a further problem that the working chamber is apt to be quenched at the trailing side thereof. These problems usually cause incomplete combustion of the air-fuel mixture at the trailing side of the working chamber resulting in an increase in pollutant emissions and low fuel economy.

Fuel injection type engines are believed as being advantageous in respect of pollutant emissions and fuel economy since in this type of engines it is relatively easy to establish a stratified fuel distribution in the working chamber to form relatively rich mixture at the leading side thereof. However, in fuel injection type engines, problems arise in respect of the fuel atomization since an adequate time is not available for obtaining satisfactory mixing of fuel with air. This is particularly true in light load engine operation in which only small amount of air is introduced into the working chamber with a relatively low speed. In light load engine operation, it is thus very difficult to attain adequate atomization of injected fuel and intimate mixing of fuel with air with the result that appreciable amount of fuel is deposited on the surfaces of the working chamber causing an increase in fuel consumption and pollutant emissions.

Thus, the present invention has an object to provide a fuel injection type rotary piston engine in which fuel is injected into the intake working chamber in such a manner that an optimum fuel distribution and atomization can be established.

A further object of the present invention is to provide a fuel injection type rotary piston engine in which fuel injection timing is so determined that an improved fuel atomization can be established.

Another object of the present invention is to provide a rotary piston engine in which relatively fuel rich mixture is formed at the leading part of the intake working chamber.

Still further object of the present invention is to provide a rotary piston engine in which pollutant emissions and fuel consumption are minimized.

According to the present invention, the above and other objects can be accomplished by a rotary piston type internal combustion engine comprising a casing which includes a rotor housing having an inner wall of multi-lobed trochoidal configuration and a pair of side housings secured to the opposite sides of the rotor housing to define therein a cavity of multi-lobed trochoidal configuration having a center axis, a substantially polygonal rotor having a center axis and disposed in said cavity for rotation about its own center axis and revolution about the center axis of the trochoid of the cavity with apex portions in sliding contact with the inner wall of the rotor housing, said rotor having flanks each defining with said inner wall of the rotor housing a working chamber variable in volume through an intake, a compression, an expansion and an exhaust strokes in each cycle of rotation of the rotor, eccentric shaft means having a first portion with an axis aligned with the center axis of the rotor and carrying said rotor and a second portion offset from the first portion and having an axis aligned with the center axis of the trochoid, exhaust port means provided in said casing so as to open to the cavity at a working chamber which is in the exhaust stroke, first intake port means provided in said rotor housing so as to open to said cavity at a working chamber which is in intake stroke, first intake passage means having a longitudinal axis and leading to said first intake port means, said axis of the first intake passage means being slanted in the direction of rotor rotation at least in the vicinity of the first intake port means, second intake port means provided in at least one of said side housings so as to open to said cavity at the intake working chamber, second intake passage means leading to the second intake port means and having control valve means provided therein, means for opening said control valve means in relatively high load range of engine operation, fuel injection nozzle means having an axis and provided in said rotor housing between said first intake port means and point of intersection of said longitudinal axis of said first intake passage means with the inner wall of the rotor housing, means for supplying fuel to the fuel injection nozzle means in such a manner that the fuel is injected therefrom into the intake working chamber at a timing when point of intersection between extension of the axis of the nozzle means and the flank of the rotor is in an area of the flank which is at a side of rotor rotation from the center of the flank and when the angle of rotation of said eccentric shaft means is between 60° before and 75° after an orientation of the shaft wherein the rate of volume change of the working chamber is the largest, each flank of the rotor being formed with recess means in said area which is at the side of rotor rotation.

According to the features of the present invention, since fuel is injected into the intake working chamber at a timing wherein the rate of volume change of the working chamber is relatively large and therefore the flow speed of the intake air is relatively high, satisfactory atomization of fuel can be ensured. In addition, the arrangements of the first intake passage means and the first intake port means in combination with the timing of fuel injection are effective to establish stratified fuel distribution with relatively rich mixture at the leading part of the working chamber. In a preferable mode of the present invention, the first intake port means provided in the rotor housing has an effective area which is smaller than that of the second intake port means, whereby intake air can be introduced under light load operation only through the first intake port at a relatively high speed. It is also preferable to provide check valve means such as a reed valve in the first intake passage means leading to the first intake port means.

In order to minimize the overlap period in which the intake port bridges the intake and exhaust working chambers, it is preferable to locate the first intake port in such a position that it is brought out of communication with the intake working chamber after the bottom dead center position at which the intake working chamber possesses the maximum volume. Further, the first intake port means is preferably of such a configuration that the dimension in axial direction of the rotor housing is large in relation to that in peripheral direction thereof.

In a further preferable mode of the present invention, the angle between the extension of the axis of the first intake passage means and that of the axis of the fuel injection nozzle means is between 70° and 130°, and the circumferential spacing between the first intake port and the fuel injection nozzle is between 45° and 135° in terms of the angle of rotation of the eccentric shaft. The arrangements of the first intake port means and the fuel injection nozzle means are found as being effective in attaining improved atomization of fuel and in directing the atomized fuel toward the leading part of the intake working chamber.

The above and other objects and features of the present invention will become apparent from the following descriptions of preferred embodiments taking reference to the accompanying drawings, in which:

FIG. 3 is a diagram showing the relationship between the working chamber volume and the angle of rotation of the eccentric shaft;

FIG. 4 is a diagrammatical view of a rotary piston engine showing general arrangements of fuel injection control means;

Figure 1:
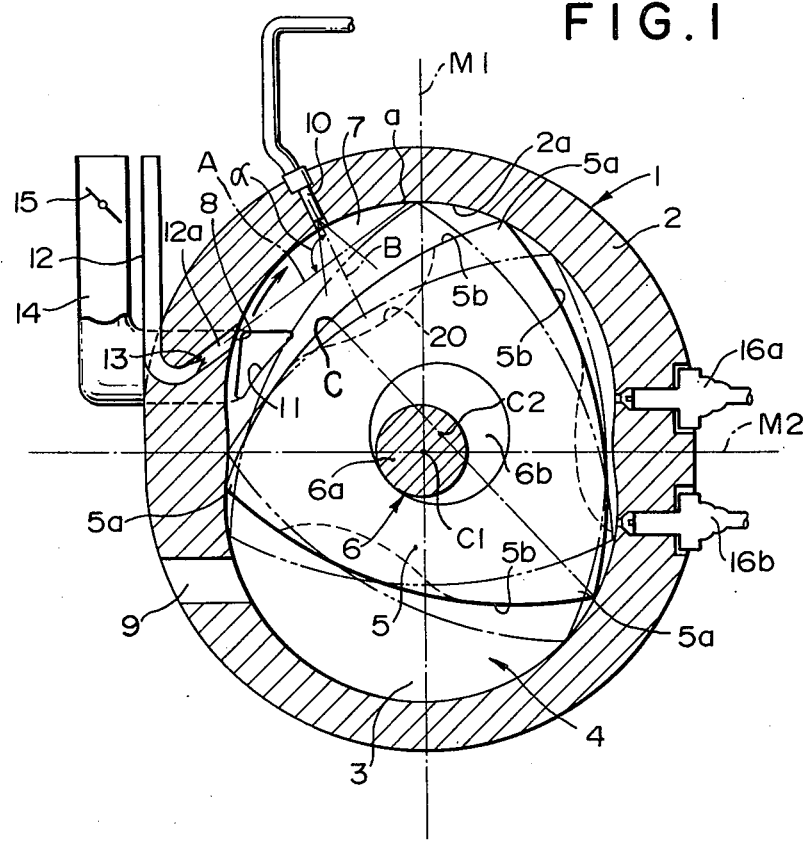
FIG. 1 is a sectional view of a rotary piston engine embodying the features of the present invention.

Referring now to the drawings, particularly to FIG. 1, the rotary piston engine shown therein includes a casing 1 which comprises a rotor housing 2 having an inner wall 2a of two-lobed trochoidal configuration and a pair of side housings 3 secured to the opposite sides of the rotor housing to define therein a cavity 4 of trochoidal configuration having a center C1 and major and minor axes M1 and M2. A substantially triangular rotor 5 is disposed in the cavity 4 with center C2 offset from the center C1 of the cavity 4. The rotor 5 is carried by an eccentric shaft 6 having a shaft portion 6a coaxial with the center C1 of the cavity 4 and an eccentric portion 6b co-axial with the center C2 of the rotor 5. In this manner, the rotor 5 is supported for rotation about its axis C2 and revolution about the center C1 of the cavity 4 with apex portions 5a in sliding contact with the inner wall 2a of the rotor housing 2. Thus, a working chamber 7 of variable volume is defined between the inner wall 2a and each flank 5b of the rotor 5. The rotor 5 is provided on each flank 5b with a recess 20 at the leading side thereof for the purpose described later.

The rotor housing 2 is formed with a first intake port 8 opening to the cavity 4 at the working chamber 7 which is in intake stroke and an exhaust port 9 opening to the cavity 4 at the working chamber 7 in exhaust stroke. The rotor housing 2 is further provided with a fuel injection nozzle 10 for supplying fuel into the intake working chamber 7. In the illustrated embodiment, one of the side housings 3 is formed with a second intake port 11 opening to the cavity 4 at the intake working chamber 7.

The first of peripheral intake port 8 is connected with a first intake passage 12 which is provided with a check valve such as a reed valve 13. The second or side intake port 11 is connected with a second intake passage 14 having a control or throttle valve 15 disposed therein. Further, the rotor housing 2 is provided with two ignition plugs 16a and 16b as in conventional rotary piston engines.

According to a feature of the present invention, the first intake passage 12 has an outlet portion 12a leading to the intake port 8 and inclined with respect to the minor axis M2 of the trochoid of the rotor housing 2 in the direction of the rotor rotation. Thus, the extension A of the axis of the outlet portion 12a intersects the inner wall 2a of the rotor housing 2 at point a as shown in FIG. 1. The fuel injection nozzle 10 is disposed in the area of the inner wall 2a between the peripheral intake port 8 and the point a in such a manner that the extension B of the axis of the nozzle 10 intersects the extension A of the axis of the first intake passage outlet portion 12a. In a preferable arrangement, the angle $\alpha$ of inersection between the extention lines A and B is between 70° and 130°. Further, the circumferential spacing or distance between the intake port 8 and the fuel injection nozzle 10 is peferably between 45° and 135° as represented by the angle of rotation of the eccentric shaft 6. In other words, the intake port 8 and the nozzle 10 are spaced apart from each other in such a distance that, after one of the apex portions 5a of the rotor 5 has passed through the intake port 8, the eccentric shaft 6 rotates through an angle of 45° to 135° before the same apex portion 5a reaches the position of the fuel injection nozzle 10.

The first intake port 8 has an area which is small in relation to that of the second intake port 11. Further, the first intake port 8 is of such a configuration that the dimension in the circumferential direction of the rotor housing 2 is small in relation to that in the axial direction thereof in order to decrease the overlap period in which the port 8 bridges the intake and exhaust working chambers. Preferably, the position of the first intake port 8 is such that it is brought out of communication with the intake working chamber 7 after bottom dead center wherein it possesses the maximum volume. This will be effective to substantially decrease or eliminate possible back-flow of combustion gas in the exhaust working chamber into the intake working chamber.

The second or side intake port 11 is provided in such a position in that it is closed before the first intake port 8 is closed. The throttle or control valve 15 provided in the second intake passage 14 is adapted to be opened and control air flow passing therethrough under a high load operation of the engine so that, under a light load engine operation, intake air is supplied only through the peripheral intake port 8. It will of course be understood that a throttle valve of known construction may be provided in the first intake passage 12 to control the air flow passing therethrough.

Figure 2:
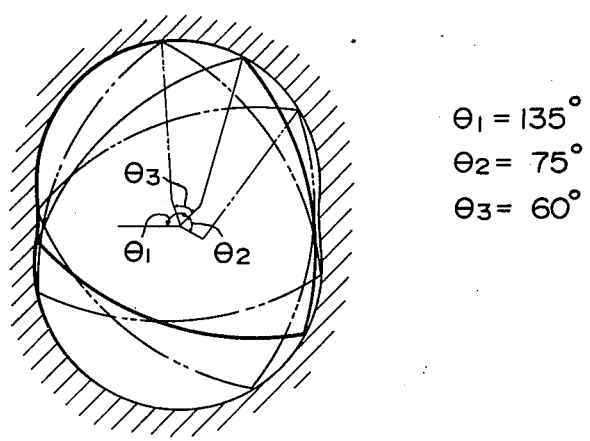
FIG. 2 is diagrammatical illustration showing the relationship between the angle of rotation of the eccentric shaft and change of volume in working chambers.

FIGS. 2 through 4 show the manner of control of fuel discharge in accordance with the present invention. Referring to FIG. 4, the engine is provided with a fuel injection pump 17 which may be of a conventional type and which may be driven by the engine itself. The pump 17 has an outlet which is connected through an injection conrol device 18 with the fuel injection nozzle 10. There is also provided a phase detecting device 19 which is adapted to detect the angular position of the eccentric shaft 6 and produces a signal in accordance with the phase or the position of the shaft 6. The signal from the phase detecting device 19 is applied to the injection control device 18 to determine the fuel injection timing.

Referring now to FIGS. 2 and 3, there is shown the relationship between the angular phase or position of the eccentric shaft 6 and the volume of the intake working chamber 7. Referring particularly to FIG. 2, the angle $\theta_1$ represents the position of the center $C_2$ of the triangular rotor 5 or the axis of the eccentric portion 6b of the shaft 6 with respect to the center $C_1$ of the trochoidal cavity 4, that is, the axis of the portion 6a of the shaft 6, as measured from the minor axis $M_2$ of the trochoid.

As shown in FIG. 3, the volume of each working chamber 7 cyclically changes in accordance with the angle $\theta$, that is, the phase of the eccentric shaft 6. The rate of volume change of the working chamber 7 can be represented by the inclination of the tangent line at each point on the curve in FIG. 3. Thus, it will be seen that the volume change rate becomes the largest when the angle $\theta$ is 135°.

In accordance with the present invention, fuel injection is performed in such a timing when the rate of volume change of the intake working chamber 7 is relatively high. More specifically, the fuel injection timing is determined in the range between 60° before and 75° after the position of the eccentric shaft 6 wherein the rate of volume change of the intake working chamber is the largest.

In accordance with a further aspect of the present invention, fuel injection timing is further limited to such a period wherein the extension B of the axis of the fuel injection nozzle 10 intersects the flank 5b of the rotor 5 at the leading side of the center C thereof.

In the above described arrangement, since fuel is injected into the intake working chamber 7 when the intake air flow speed is relatively high, atomization of injected fuel is enhanced. The second intake passage 14 leading to the side intake port 11 is closed in light load engine operation and intake air is introduced only through the peripheral intake port 8 which is of smaller area than the side intake port 11, so that adequate intake flow speed can be ensured to attain improved fuel atomization even under the light load or low speed engine operation. Since the outlet part 12a of the first intake passage 12 is inclined with respect to the minor axis of trochoid of the rotor housing 2 in the direction of rotor rotation and the injected fuel from the nozzle 10 intersects the air flow from the peripheral intake port 8 as described previously, the air-fuel mixture thus formed is directed to the leading part of the intake working chamber 7 and produces a swirl of mixture in or around the recess 20 in the rotor flank 5b. The flow in the swirl may then be brought into collision with the air stream flowing along the inner wall 2a of the rotor housing in the direction of rotor rotation and again brought back toward the leading part of the intake working chamber 7. Thus, it is possible to obtain an improved mixing of fuel with air and stratified fuel distribution can further be established under light load engine operation with rich mixture at the leading part of the working chamber. This tendency can also be enhanced by injecting fuel into the working chamber 7 when the extension B of the nozzle axis intersects the rotor flank 5b at the leading side of the center C thereof as previously described.

Figure 5:
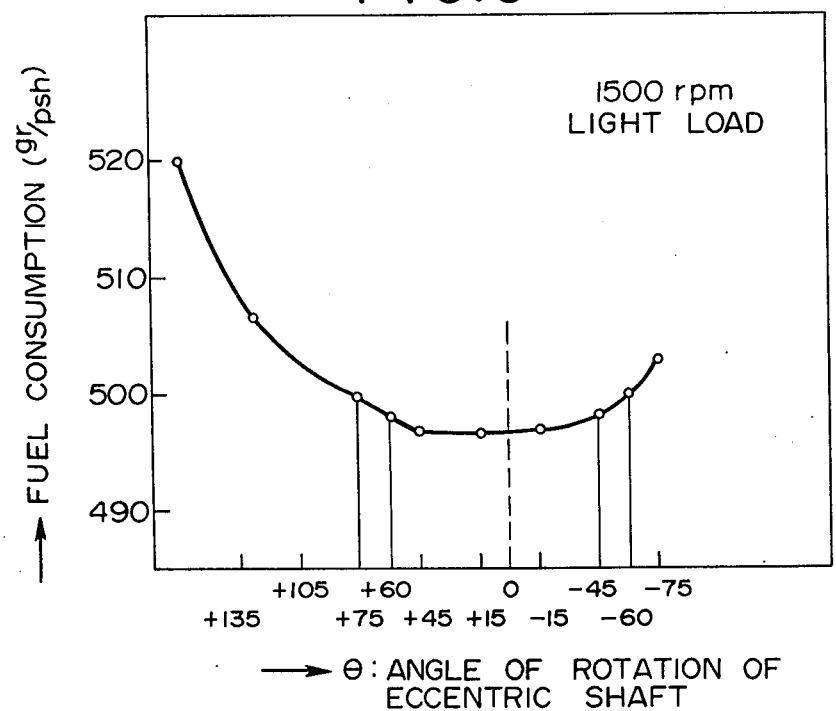
FIG. 5 is a diagram showing the relationship between the fuel injection timing and the fuel consumption.

FIG. 5 shows influence of the fuel injection timing on the fuel consumption. In the drawing, the abscissa shows the injection timing in terms of the angular position of the eccentric shaft 6 with respect to the reference position of the shaft 6 wherein the rate of volume change of the working chamber 7 is the largest. The ordinate designates the fuel consumption in terms of gr/hp.hr. It will be noted in the drawing that an improved fuel economy can be attained when the fuel injection timing is determined between 60° before and 75° after the reference position. More improved results can be accomplished with the fuel injection timing of between 45° before and 60° after the reference position.

Figure 6:
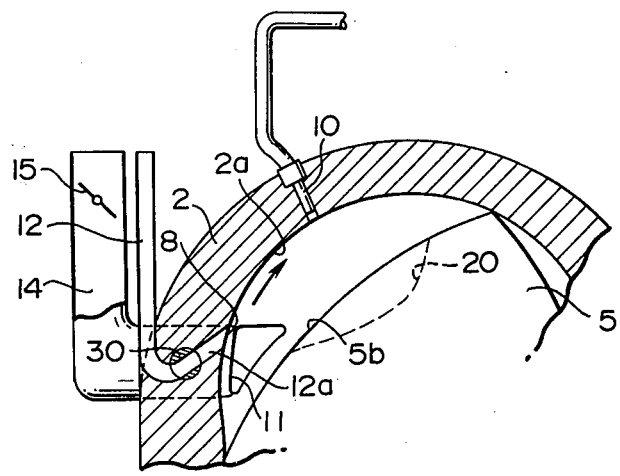
FIG. 6 is a fragmentary sectional view of a rotary piston engine in accordance with another embodiment of the present invention.

FIG. 6 shows in the form of a fragmentary view another embodiment of the present invention. The engine in accordance with the embodiment is substantially same as that in the previous embodiment so that corresponding parts are shown by the same reference numerals as in the previous embodiment. In this embodiment, the outlet portion 12a of th first intake passage 12 leading to the first or peripheral intake port 8 is provided with a manual control valve 30 in lieu of the reed valve 13 in the previous embodiment so that the amount of flow through the first intake passage 12 can be manually controlled. The control valve 15 in the second intake passage 14 leading to the second intake port 11 is opened under heavy load condition and controls the air flow through the passage 14.

The present invention has thus been shown and described with reference to specific embodiments, however, it should be noted that the invention is in no way limited to the details of the illutrated structures but changes and modifications may be made without departing from the scope of the appended claims.

We claim:

1. Rotary piston type internal combustion engine comprising a casing which includes a rotor housing having an inner wall of multi-lobed trochoidal configuration and a pair of side housings secured to the opposite sides of the rotor housing to define therein a cavity of multi-lobed trochoidal configuration having a center axis, a substantially polygonol rotor having a center axis and disposed in said cavity for rotation about its own center axis and revolution about the center axis of the trochoid of the cavity with apex portions in sliding contact with the inner wall of the rotor housing, said rotor having flanks each defining with said inner wall of the rotor housing a working chamber variable in volume through an intake, a compression, an expansion and an exhaust strokes in each cycle of rotation of the rotor, eccentric shaft means having a first portion with an axis aligned with the center axis of the rotor and carrying said rotor and a second portion offset from the first portion and having an axis aligned with the center axis of the trochoid, exhaust port means provided in said casing so as to open to the cavity at a working chamber which is in the exhaust stroke, first intake port means provided in said rotor housing so as to open to said cavity at a working chamber which is in intake stroke, first intake passage means having a longitudinal axis and leading to said first intake port means, said axis of the first intake passage means being slanted in the direction of rotor rotation at least in the vicinity of the first intake port means, second intake port means provided in at least one of said side housings so as to open to said cavity at the intake working chamber, second intake passage means leading to the second intake port means and having control valve means provided therein, means for opening said control valve means in relatively high load range of engine operation, fuel injection nozzle means having an axis and provided in said rotor housing between said first intake port means and point of intersection of said longitudinal axis of said first intake passage means with the inner wall of the rotor housing, means for supplying fuel to the fuel injection nozzle means in such a manner that the fuel is injected therefrom into the intake working chamber at a timing when point of intersection between extension of the axis of the nozzle means and the flank of the rotor is in an area of the flank which is at the leading side of rotor rotation from the center of the flank and when the angle of rotation of said eccentric shaft means is between 60° before and 75° after an orientation of the shaft wherein the rate of volume change of the working chamber is the largest, each flank of the rotor being formed with recess means in said area which is at the leading side of rotor rotation.

2. Rotary piston engine in accordance with claim 1 in which said first intake port means has an area which is small in relation to that of the second intake port means.

3. Rotary piston engine in accordance with claim 1 in which said first intake port means is defined by opening means which has a small dimension in the circumferential direction of the rotor housing inner wall and a large dimension in the axial direction thereof.

4. Rotary piston engine in accordance with claim 1 in which said first intake passage means and said fuel injection nozzle means are arranged in such a manner that extensions of the axes of these means intersects each other with an angle between 70° and 130°.

5. Rotary piston engine in accordance with claim 1 in which said first intake port means and said fuel injection nozzle means are spaced apart in circumferential direction by 45° to 135° in terms of the angle of rotation of the eccentric shaft.

6. Rotary piston engine in accordance with claim 1 in which said first intake passage means is provided with check valve means which allows flow of fluid only in the direction of the first intake port means.

7. Rotary piston engine in accordance with claim 6 in which said check valve means is a reed valve.

8. Rotary piston engine in accordance with claim 1 in which said first intake passage means is provided with manual control valve means.

9. Rotary piston engine in accordance with claim 1 in which said first intake port means is so located that it is closed after bottom dead center wherein the intake working chamber possesses the largest volume.

10. Rotary piston engine in accordance with claim 1 in which said first and second intake port means are located in such a manner that the first intake port means is closed later then the second intake port means.

11. Rotary piston engine in accordance with claim 1 in which said first intake port means has an area which is small in relation to that of the second intake port means, and said first intake passage means and said fuel injection nozzle means are arranged in such a manner that extensions of the axes of these means intersects each other with an angle between 70° and 130°.

12. Rotary piston engine in accordance with claim 1 in which said first intake passage means and said fuel injection nozzle means are arranged in such a manner that extensions of the axes of these means intersects each other with an angle between 70° and 130°, and said first intake port means and said fuel injection nozzle means are spaced apart in circumferential direction by 45° to 135° in terms of the angle of rotation of the eccentric shaft.

13. Rotary piston engine in accordance with claim 1 in which said first intake port means has an area which is small in relation to that of the second intake port means, and said first intake port means and said fuel injection nozzle means are spaced apart in circumferential direction by 45° to 135° in terms of the angle of rotation of the eccentric shaft.

14. Rotary piston engine in accordance with claim 1 in which said first intake port means has an area which is small in relation to that of the second intake port means, said first intake passage means and said fuel injection nozzle means being arranged in such a manner that extensions of the axes of these means intersects each other with an angle between 70° and 130°, said first intake port means and said fuel injection nozzle means being spaced apart in circumferential direction by 45° to 135° in terms of the angle of rotation of the eccentric shaft.

* * * * *